(12) United States Patent
Aikenhead (10) Patent No.: US 10,363,990 B1
(45) Date of Patent: Jul. 30, 2019

(54) HEEL OR BALL OF FOOT ENGAGING BICYCLE PEDAL

(71) Applicant: Kristine Aikenhead, West Chicago, IL (US)

(72) Inventor: Kristine Aikenhead, West Chicago, IL (US)

( * ) Notice: Subject to any disclaimer, the term of this patent is extended or adjusted under 35 U.S.C. 154(b) by 0 days.

(21) Appl. No.: 16/018,045

(22) Filed: Jun. 25, 2018

Related U.S. Application Data (60) Provisional application No. 62/524,582, filed on Jun. 25, 2017.

(51) Int. Cl.
   *B62M 3/00* (2006.01)
   *B62M 3/08* (2006.01)

(52) U.S. Cl.
   CPC .................. *B62M 3/08* (2013.01)

(58) Field of Classification Search
   CPC .................. B62M 3/08; B62M 3/16
   See application file for complete search history.

(56) References Cited

U.S. PATENT DOCUMENTS

| 4,429,950 | A | * | 2/1984 | Zwahlen | B62M 3/12 |
|---|---|---|---|---|---|
| | | | | | 359/521 |
| D333,113 | S | * | 2/1993 | Nestrud | D12/125 |
| 6,647,826 | B2 | * | 11/2003 | Okajima | B62M 3/08 |
| | | | | | 74/563 |
| 8,117,944 | B2 | * | 2/2012 | Stevovich | B62M 3/08 |
| | | | | | 74/594.3 |
| 2007/0163380 | A1 | * | 7/2007 | Chen | B62M 3/08 |
| | | | | | 74/594.4 |
| 2013/0061715 | A1 | * | 3/2013 | Kim | B62M 3/08 |
| | | | | | 74/594.7 |
| 2014/0090516 | A1 | * | 4/2014 | Liang | B62M 3/08 |
| | | | | | 74/594.4 |
| 2015/0053045 | A1 | * | 2/2015 | Barjesteh | B62M 3/08 |
| | | | | | 74/594.4 |

FOREIGN PATENT DOCUMENTS

| DE | 10000416 A1 | * | 7/2001 | A43B 5/14 |
|---|---|---|---|---|
| DE | 202013004398 U1 | * | 5/2013 | B62M 3/08 |

* cited by examiner

*Primary Examiner* — Adam D Rogers
(74) *Attorney, Agent, or Firm* — Steven Ivy P.C.

(57) ABSTRACT

A bicycle pedal assembly with transposable mounting capabilities, comprised of two pedal blocks with a protruding heel triangle, sandwiched together to form two double-sided pockets and a clearance hole, wherein each of the two double-sided pockets houses a ball bearing, with the clearance hole housing a bolt, acting in conjunction with said ball bearings as the pedal's spindle, attachable to the a crank arm of a bicycle, whereby during the process of riding a bicycle, a cyclist may use the protruding heel triangle to make contact with the heel of his/her shoe, changing the stresses applicable on the cyclist's foot and ligaments, thereby generating various health-related benefits, including but not limited to reduction of stress on the lower back muscles, decrease of hip bone abnormalities, strengthening of the gluteal and the hamstring muscles, and reduced chances of injury to metatarsal bones.

5 Claims, 7 Drawing Sheets

HEEL OR BALL OF FOOT ENGAGING BICYCLE PEDAL

RELATED PATENT APPLICATION

The present Non-Provisional U.S. Patent Application claims priority under 35 U.S.C. § 119(e) to U.S. Provisional Patent Application No. 62/524,582, tiled Bicycle Pedal, filed on Jun. 25, 2017, the subject matter of which is incorporated herein by reference.

FIELD OF THE INVENTION

The present invention addresses the general field of bicycles, their components and accessories.

BACKGROUND OF THE INVENTION

The design of a common bicycle pedal can be divided into several categories, including but not limited to flat, quill and step-in.

The quill pedal, focuses on the simplicity of design and its effectiveness. The simplicity of the design can be attributed to its three piece construction, typically incorporating a center spindle and two parallel cage plates, with a multitude of gripping spikes to prevent the slippage of the rider's shoe. Although the quill design offers some functional improvements over the flat bicycle pedal, it comes with several inherent shortcomings. Similarly to the flat pedal, the users of the quill pedal must exert a lot of force on the ball of their foot, which leads to painful experiences associated with the inflammation of the metatarsal bones. Another common cause for cyclists' injuries is frequent and unpredictable detachment (slippage) of the cyclist's foot from the pedal.

To prevent any unwanted disengagement of the rider's foot from the quill pedal, toe clips are frequently attached to the front cage of the pedal. In fact, over time, improvements of this type have given birth to a completely new category of bicycle pedals, called the step-in or clip-in pedals. However, both of these improvements have not been able to solve the problem associated with overusing the ball of the rider's foot. In fact, these design improvements have created an additional problem associated with overburdening the tips of the rider's toes, as the contact between the rider's toes and the metal structure of the pedal have been firmly fixed.

Perhaps the most common, among the three categories listed herein, is the flat pedal, also known as the platform bicycle pedal. This type of a bicycle pedal offers a large flat area for the rider's foot to press on, simplifying the process of engaging, or disengaging, the rider's foot from the pedal. Platform pedals may be further subdivided into different subcategories of usage. Wherein each subcategory is constantly evolving by ongoing implementation of new design features, to accommodate the ever popular mountain biking, or to improve cyclists' comfort level when riding on a flat terrain and paved roads.

In spite of the above-mentioned developments, flat bicycle pedals still harbor several key shortcomings. The primary shortcoming addresses the contact point between the cyclist's foot and the pedal. Specifically, the flat surface of the pedal forces the rider to exert a large amount of force on the front section of his/her foot, leading to the inflammation of the metatarsal bones and pain in the ball of the foot.

The present invention addresses the shortcomings of the above-mentioned bicycle pedal designs, by introducing a new, platform-type pedal assembly. This new design comes with a heel triangle, protruding from the top midsection of the peal assembly. This new design is not resolving the slippage of the foot problem, but rather focuses on the point of contact between the cyclist's foot and the pedal, and its health-related benefits.

Specifically, during the process of riding a bicycle with the new pedal assembly, the cyclist pushes with the heel of his/her shoe up against the opposites side of the heel triangle. This new way of pushing the bicycle pedal, changes the required forces to propel the bicycle forward, and alters the stresses applicable on the cyclist's foot and ligaments. These changes in both the required force and the location of stresses on the human body, generates various health-related benefits, including but not limited to: 1) reduction of stress on the lower back muscles; 2) decrease of hip bone abnormalities; 3) strengthening of the gluteal and the hamstring muscles; 4) reduced chances of injury to metatarsal bones.

SUMMARY OF THE INVENTION

The following information is intended to be a brief summary of the invention, and as such, said information shall not be used as the means of limiting the scope of the invention:

The present invention discloses a bicycle pedal assembly with a heel triangle protruding from the top midsection of the peal assembly, comprising of an opposite, adjacent and hypotenuse sides.

The invention comprises of six components, including two pedal blocks, two ball bearings (or similarly functioning, self lubricating sleeve bearings, or needle bearings), spindle bolt, and a hollow/tubular spacer.

The two pedal blocks are sandwiched together to form two double-sided pockets and a clearance hole. Each of the two double-sided pockets houses a ball bearing, and the clearance hole is made to house a long bolt, acting in conjunction with said ball bearings as the pedal's spindle, attachable to the crankarm of a bicycle.

During the process of riding a bicycle and using said pedal assembly, the cyclists pushes with the heel of his/her shoe up against the opposites side of the heel triangle, changing the stresses applicable on the cyclist's foot and ligaments, thereby generating various health-related benefits, including but not limited to: 1) reduction of stress on the lower back muscles; 2) decrease of hip bone abnormalities; 3) strengthening of the gluteal and the hamstring muscles; 4) reduced chances of injury to metatarsal bones.

BRIEF DESCRIPTION OF THE DRAWINGS

The components shown in the drawings are not to scale. In the interest of clarity, some of the components might be shown in a generalized form and could be identified utilizing commercial designations. All components, including its essential features, have been assigned reference numbers that are utilized consistently throughout the descriptive process outlined herein.

DESCRIPTIVE KEY

100—pedal assembly
110—pedal block
109—top surface
111—top midsection
112—bottom surface
113—bottom midsection
114—bearing pocket
115—bolt pocket
116—short side wall
117—long side wall
118—small lightening openings
119—large lightening openings
120—heel triangle
121—opposite side
122—adjacent side
123—hypotenuse side
130—spindle bolt
131—head
132—shank
133—threaded end
140—ball bearing (or equivalent)
150—spacer, hollow/tubular
200—bicycle
201—crankarm
202—chainring
203—chain
204—wheels
300—bicycle shoe
301—foot enclosure
302—sole
303—heel
304—pressure point
400—cyclist
A—aid and relief area (lower back)
B—aid and relief area (hips)
C—aid and relief area (gluteal muscle)
D—aid and relief area (hamstring)
E—aid and relief area (heel of the foot)

DETAILED DESCRIPTION OF THE PREFERRED EMBODIMENT

The following description references to the above-defined drawings and represents only an exemplary embodiment of the invention. It is foreseeable, and recognizable by those skilled in the art, that various modifications and/or substitutions to the invention could be implemented without departing from the scope and the character of the invention:

The present invention discloses components of a novel bicycle pedal and the process of their assembly. As shown in FIGS. 1, 2 3, 4, 5, 6 and 7, the pedal assembly comprises of five components: 1) two pedal blocks 110 (each block containing a top surface 109, top midsection 111, bottom surface 112, bottom midsection 113, bearing pocket 114, bolt pocket 115, short side wall 116, long side wall 117, small lightening openings 118, large lightening openings 119); 2) two heel triangles 120 (each triangle containing an opposite side 121, an adjacent side 122, and a hypotenuse side 123); 3) spindle bolt (containing a head 131, shank 132, and a threaded end 133); 4) two ball bearing; 5) hollow tubular spacer.

To utilize the described herein bicycle pedal 100, the end-user must assemble the pedal components. Once assembled, the pedal 100 may be connected to a crank arm 201 of a bicycle 200. The means of attaching a bicycle pedal to each crank arm is via a threaded hole formed in the crank arm that engages a spindle bolt in each bicycle pedal.

Figure 1:
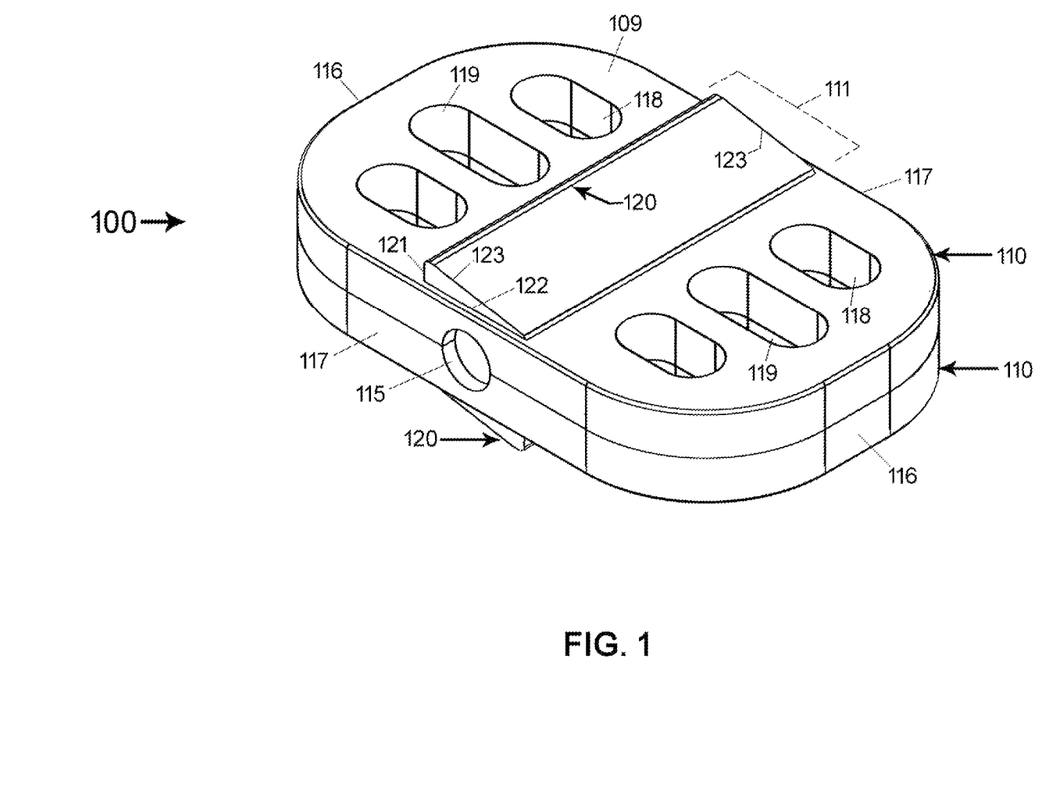
FIG. 1 is a perspective view of the pedal assembly, exposing the hypotenuse side of the heel triangle, showing two pedal blocks sandwiched together to form a double-sided bearing pocket, and a bolt hole protruding through both short side walls, in accordance with an exemplary embodiment of the present invention.
Figure 2:
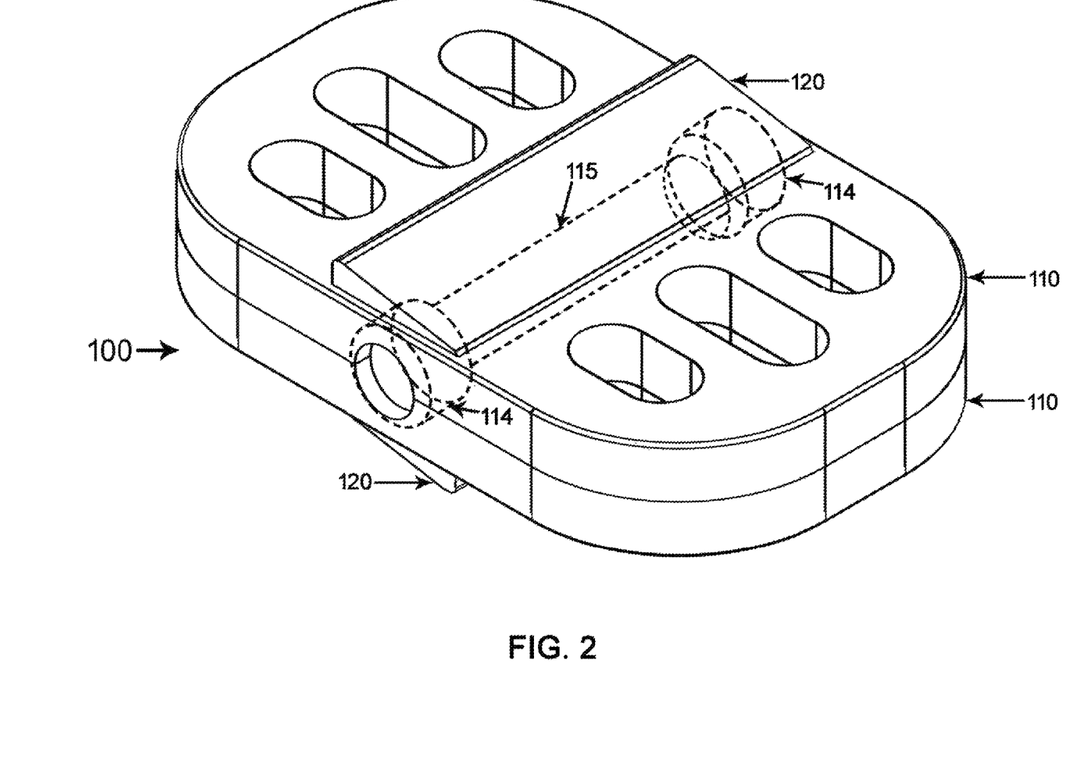
FIG. 2 is a perspective view of the pedal assembly, formed by sandwiching two pedal blocks together, using broken lines to show the hidden position of the two double-sided bearing pockets and the bolt hole, (formed by bringing the two pedal blocks together), and exposing the hypotenuse side of the heel triangle, in accordance with an exemplary embodiment of the present invention.
Figure 3:
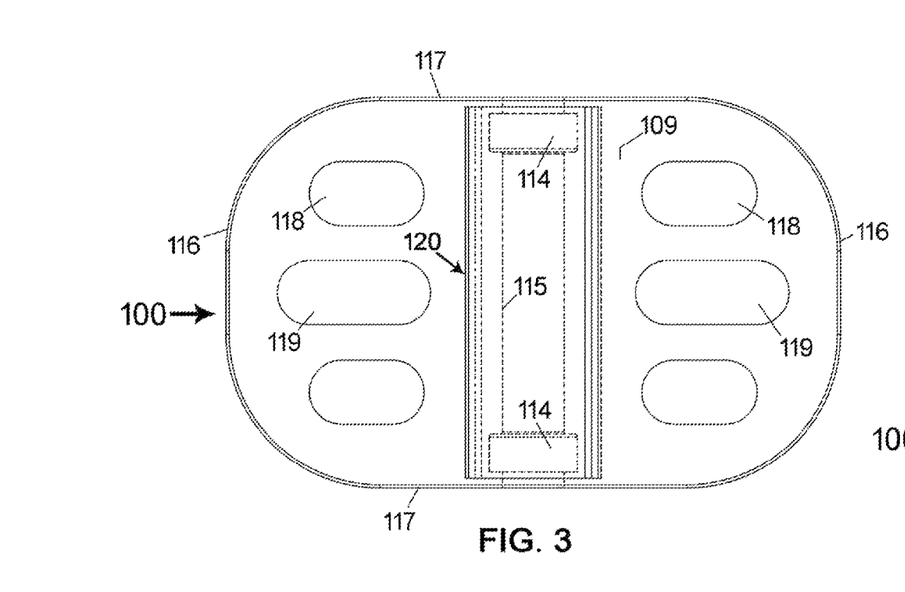
FIG. 3 is a top view of the pedal block of the pedal assembly, showing the location of both the large and the small lightening openings, using broken lines to show the hidden positions of the two double-sided bearing pockets, and the bolt hole, protruding in and out of short side walls of the assembly, in accordance with an exemplary embodiment of the present invention.
Figure 6:
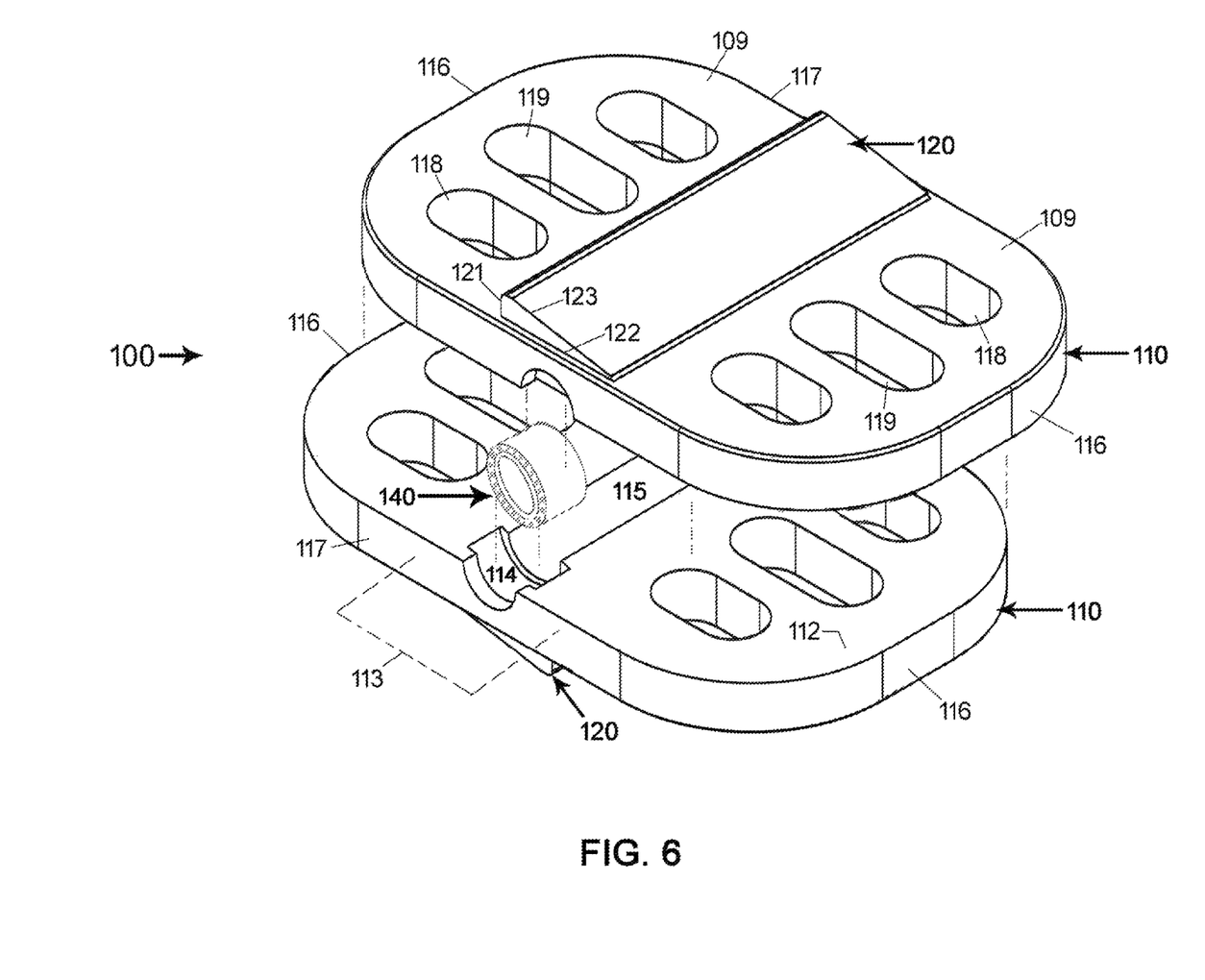
FIG. 6 is an exploded view of the pedal assembly, showing two pedal blocks separated by a ball bearing, exposing the bottom surface of the block situated below said ball bearing, thereby showing the position of both the bearing and the bolt pockets, in accordance with an exemplary embodiment of the present invention.

The pedal assembly process comprises of six steps:

1) Ball bearing placement. As shown in FIG. 6, take the first pedal block 110, place one ball bearing 140 in each bearing pocket 114 (the bearing pockets 114 are located in the midsection 113 of the bottom surface 112 of said pedal block 110);

2) Apply the adhesive. The means of joining two of said pedal blocks is adhesive or machine screws. To apply the adhesive, take the second pedal block 110, apply bonding adhesive (or in alterative machine screws) to the bottom surface 112 of the block;

3) Sandwich two pedal blocks together as shown FIGS. 1 and 2. Here, take the pedal block 110 containing the adhesive on its bottom surface 112, and press it onto the bottom surface 112 of the first pedal block, containing the two ball bearings 140 (ensuring the proper alignment of both the short 116 and the long side walls 118) as shown in FIGS. 1 and 2.

4) Wait for the adhesive to firmly bond the two pedal blocks together. Note, that the attachment of the two pedal blocks 110 formed a bolt hole (created by joining of the two bolt pockets 115 together), and two, double-sided bearing pockets (created by joining of the two bearing pockets 114 together), and which now house the two ball bearings 140, as shown in FIG. 2.

5) Attach the spindle bolt. The means of pivotally mounting said joined pedal blocks is a spindle bolt comprising a head, shank, and a threaded end.

Figure 4:
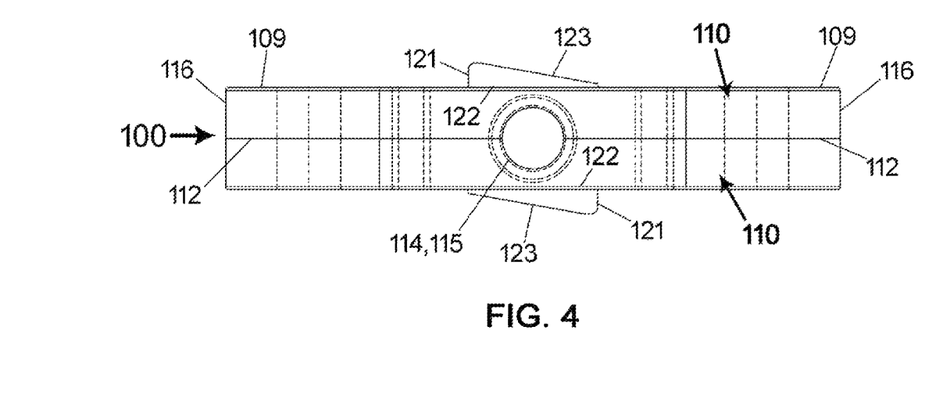
FIG. 4 is a side view of the pedal assembly, exposing the long side wall, and the side profile of the heel triangle, including the center positions of both, the double-sided bearing pocket and the bolt hole, in accordance with an exemplary embodiment of the present invention.
Figure 5:
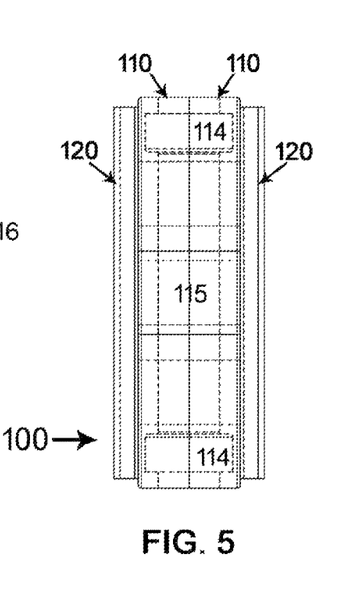
FIG. 5 is a side view, displaying the short side wall of the pedal assembly, thereby exposing the opposite side of the heel triangle, and using broken lines to show the position of the two double-sided bearing pockets, and the bolt hole, in accordance with an exemplary embodiment of the present invention.
Figure 7:
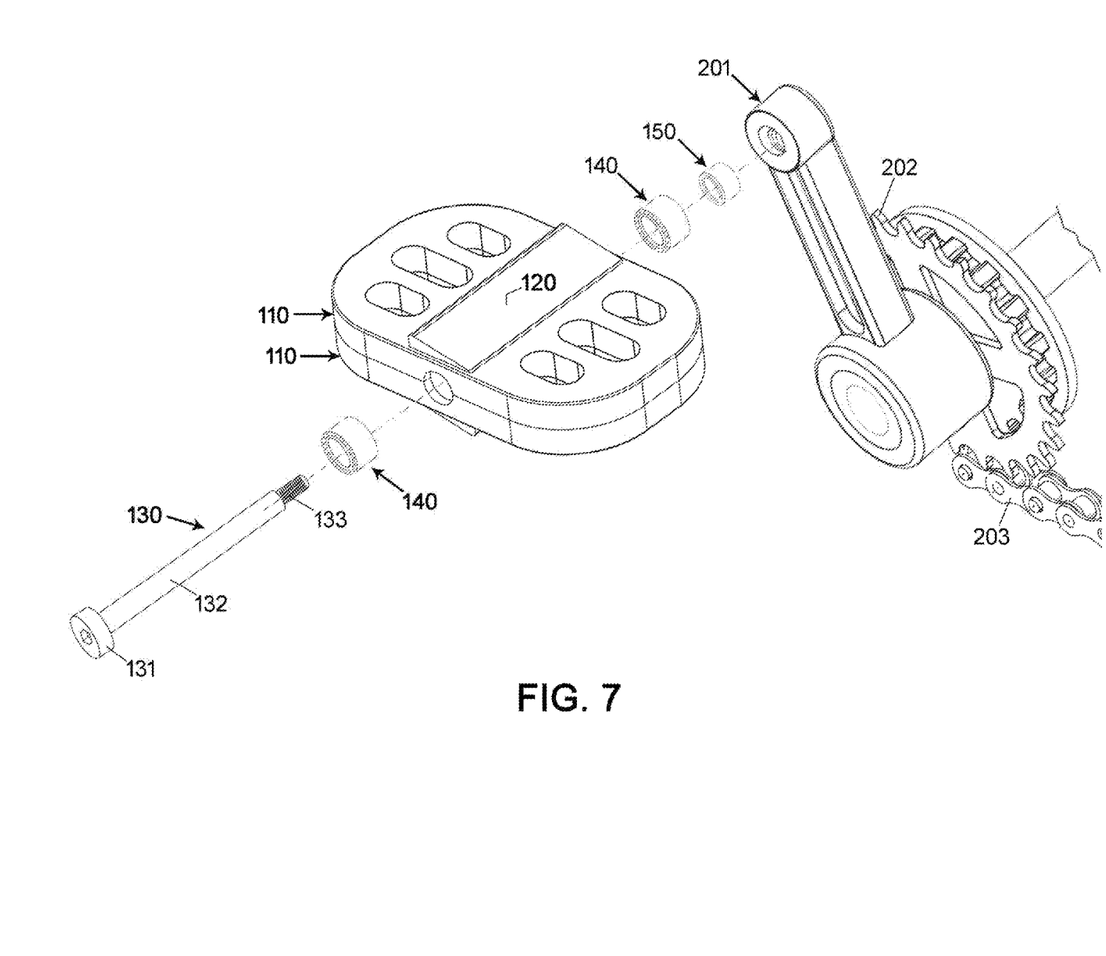
FIG. 7 is a full exploded view of the pedal assembly, including a perspective view of attachable thereto bicycle crankarm in its interrelated components (chainring, chain), wherein said exploded pedal assembly includes: 1) bolt; 2) two ball bearings; 3) two pedal blocks sandwiched together; 4) hollow/tubular spacer; in accordance with an exemplary embodiment of the present invention.
Figure 8:
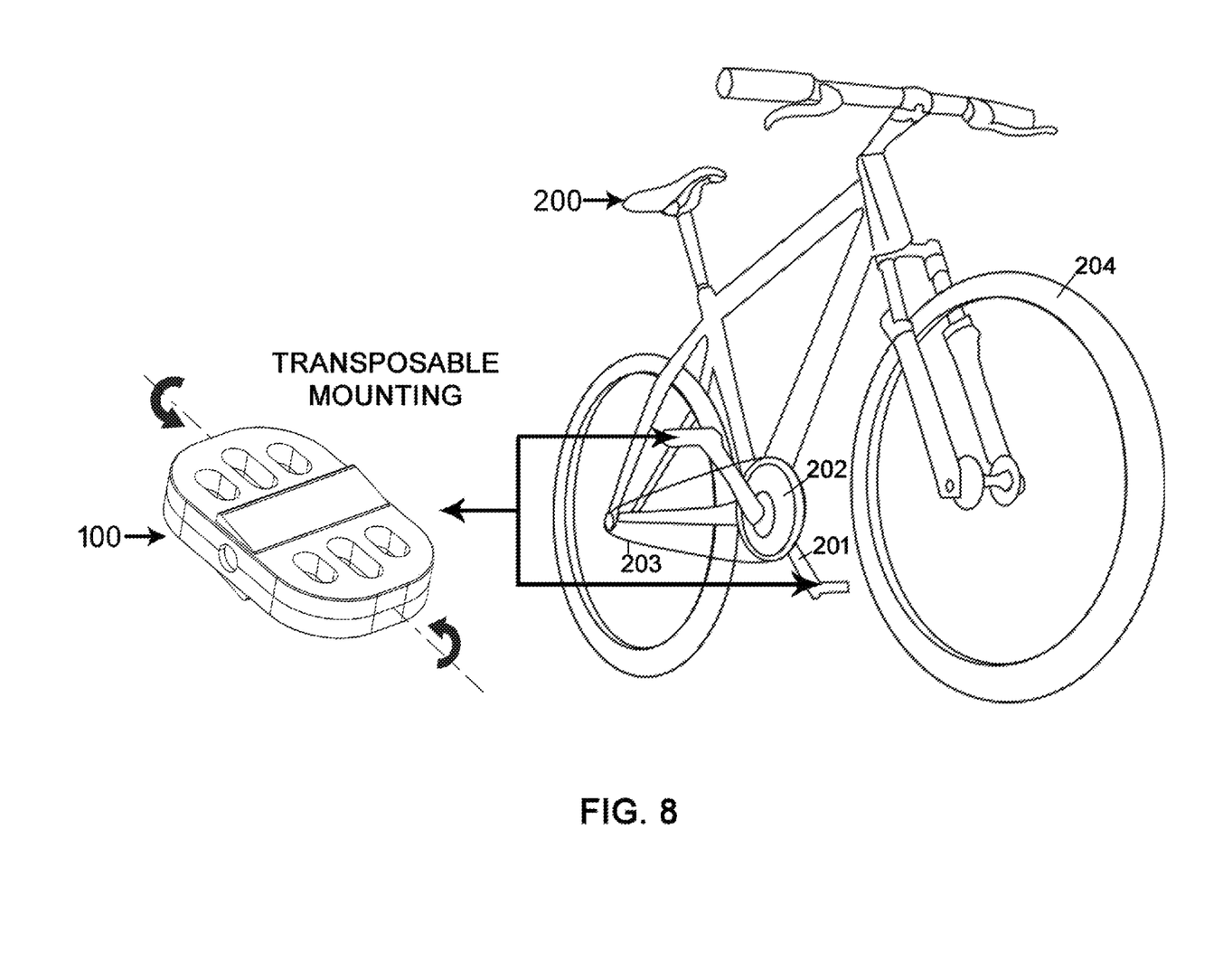
FIG. 8 is drawing of a bicycle with two pedal assemblies attached thereto, and a perspective view of an individual assembly with a phantom center line, indicating transposable mounting capabilities, allowing usage of either side of said pedal assembly for mounting to the bicycle's crankarm, in accordance with an exemplary embodiment of the present invention.
Figure 9:
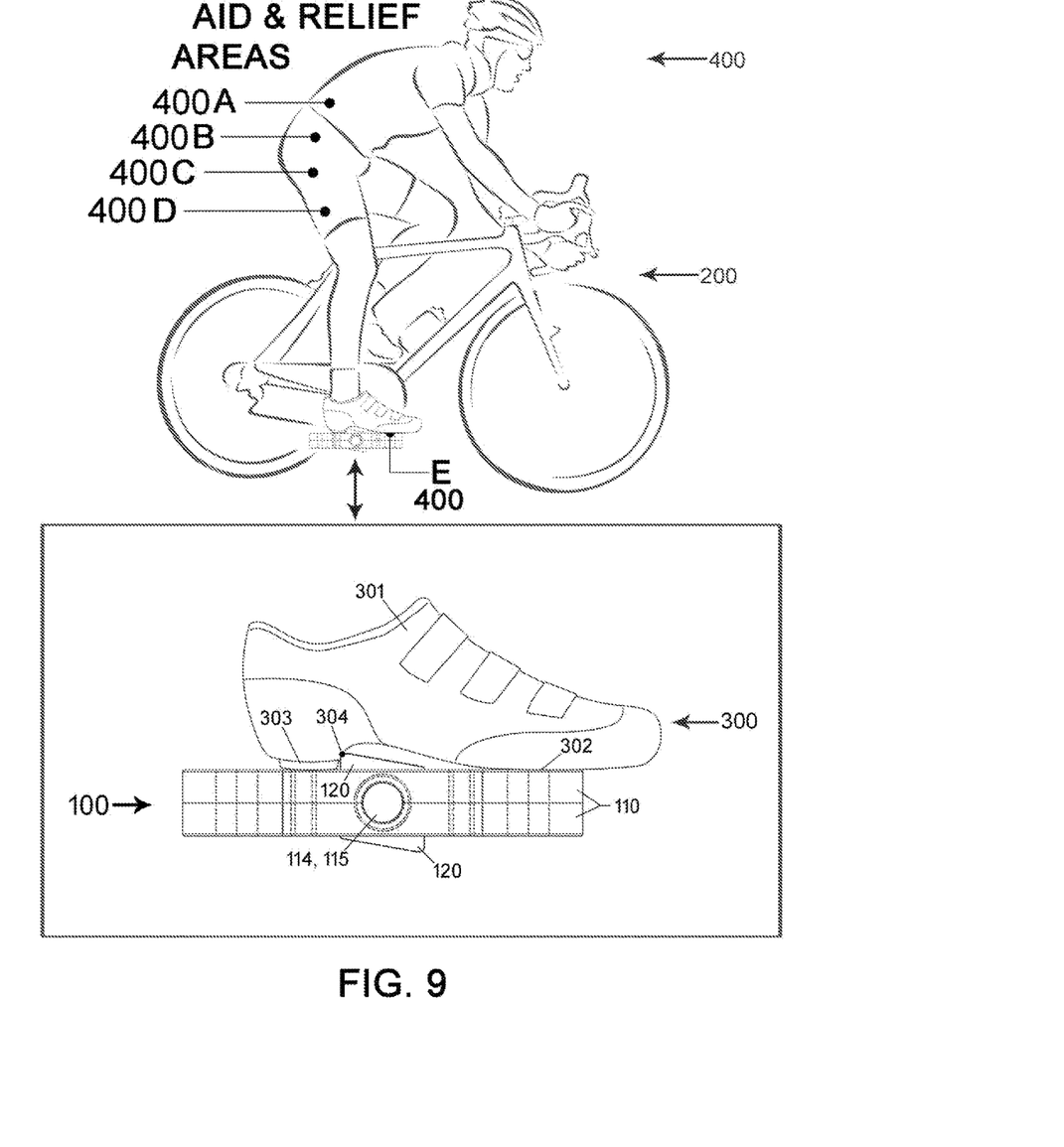
FIG. 9 is a drawing of a cyclists riding a bicycle, and a close-up view of said cyclist's shoe making contact with the pedal assembly, focusing on the contact/pressure point between the shoe and the opposite side of the heel triangle of the pedal assembly; the drawing also shows several alphabetized leaders, pointing to the "aid and relief areas" on the cyclist's body, which may be attributed to usage of said pedal assemblies, in accordance with an exemplary embodiment of the present invention.

Once the two pedal blocks 110 are firmly joined together, use the spindle bolt 130 to connect the pedal assembly 100 to the bicycle's crank arm 201, as shown in FIG. 7. Start by inserting the threaded end 133 of the bolt 130 through both ball bearings 140, ensuring that the head 131 of the bolt 130 is firmly situated up against the bearing's 140 surface;

6) Next, place the hollow/tubular spacer 150 on the threaded end of the bolt 130, and use the same threaded end 133 to thread the bolt into the crank arm 201 of the bicycle 200;

The properly assembled pedal 100 will have the opposite sides 121 of their heel triangle 120 facing in opposite directions, as shown in FIGS. 2, 4 and 9. When the pedal assembly 100 is utilized by the cyclist 400, as shown in FIG. 9, the heel 303 of the shoe 300 presses firmly up against the opposites side 121 of the heel triangle 120, changing the stresses applicable on the cyclist's foot and ligaments, thereby generating various health-related benefits, including but not limited to: 1) reduction of stress on the lower back muscles 400A; 2) decrease of hip bone abnormalities 400B; 3) strengthening of the gluteal 400C and the hamstring muscles 400D; 4) and reduced chances of injury to metatarsal bones 400E.

The means of reducing the weight of said pedal block is a plurality of small lightening holes and a plurality of large lightening holes.

I claim:

1. A bicycle pedal, comprising:
    two pedal blocks that are each comprised of:
        a top surface;
        a top midsection;
        a bottom surface;
        a bottom midsection;
        two semi-circular bearing pockets;
        a bolt pocket formed on the bottom midsection;
        two first side walls and two second side walls, wherein the first side walls are shorter than the second side walls;
        a heel triangle, shaped as a right triangle, comprising an opposite side, a hypotenuse side, and an adjacent side; said adjacent side connects the heel triangle to the top midsection;
    a means of reducing the weight of each pedal block;
    a means of joining said two pedal blocks together via their bottom surfaces, thereby creating two circular bearing pockets via the connection of the semi-circular bearing pockets, so that said second side walls are evenly matched, so that said heel triangles are positioned in an opposite direction to each other;
    a spacer, which is tubular in shape and hollow inside, located between the two joined pedal blocks;
    two ball bearings located between the two joined pedal blocks and located in the two circular bearing pockets;
    the two semi-circular bearing pockets of each of the two pedal blocks are positioned on the bottom midsection of the respective two pedal blocks;
    wherein when the two pedal blocks are brought together the bolts pockets in each of the two pedal blocks face each other and form a bolt hole running parallel to the opposite side of each heel triangle;
    wherein said bolt hole passed through the two side second side walls of each of the two pedal blocks; and
    a means of pivotally mounting said joined pedal blocks to a crank arm of a bicycle such that when a rider engages the bicycle pedal a rotational energy is transferred to a wheel of the bicycle thereby enabling said bicycle to roll along a surface.

2. The bicycle pedal of claim 1 wherein:
    said means of reducing the weight of each of said two pedal blocks is by making a plurality of first lightening openings and a plurality of second lightening openings;
    wherein the plurality of first lightening openings are smaller in shape than the plurality of second lightening openings.

3. The bicycle pedal of claim 1 wherein:
    said means of joining said two pedal blocks together is via an adhesive.

4. The bicycle pedal of claim 1 wherein:
    said means of pivotally mounting said joined pedal blocks is a spindle bolt; wherein said spindle bolt comprises of a head, a shank, and a threaded end, shaped so that:
    A) the shank of said spindle bolt can fit inside said two ball bearings,
    B) the spindle bolt being long enough to protrude, using the bolt hole, through both first side walls of each pedal block and through the spacer, which is sandwiched between the two joined pedal blocks and the crank arm, thereby allowing the threaded end of the bolt to be threaded inside a threaded hole of the crank arm.

5. The bicycle pedal of claim 1 wherein:
    said rotational energy is transferred to the wheel of the bicycle by using a chain ring and a chain, which connect the bicycle pedal held by the crank arm to the wheel of the bicycle.

* * * * *